United States Patent [19]

Sullivan

[11] 4,447,079

[45] * May 8, 1984

[54] DUCT JOINTING SYSTEM

[75] Inventor: Michael T. Sullivan, Hamilton, Canada

[73] Assignee: Exanno Products Limited, Hamilton, Canada

[*] Notice: The portion of the term of this patent subsequent to Sep. 8, 1998 has been disclaimed.

[21] Appl. No.: 299,280

[22] Filed: Sep. 4, 1981

Related U.S. Application Data

[62] Division of Ser. No. 81,501, Oct. 3, 1979, Pat. No. 4,288,115.

[30] Foreign Application Priority Data

Oct. 19, 1978 [CA] Canada ................................. 313737

[51] Int. Cl.³ ............................................. F16L 23/00
[52] U.S. Cl. .................................... 285/363; 285/424
[58] Field of Search ............... 285/363, 364, 424, 405, 285/336

[56] References Cited

U.S. PATENT DOCUMENTS

| | | | |
|---|---|---|---|
| 3,199,901 | 8/1965 | Jeppsson | 285/364 |
| 3,201,725 | 8/1965 | Johnson | 285/336 X |
| 3,214,201 | 10/1965 | Fonda | 285/424 X |
| 3,301,578 | 1/1967 | Platt et al. | 285/336 X |
| 3,712,650 | 1/1973 | Mez | 285/424 X |
| 3,923,326 | 12/1975 | Mez | 285/424 X |
| 4,123,094 | 10/1978 | Smitka | 285/424 X |
| 4,218,079 | 8/1980 | Arnoldt | 285/424 X |
| 4,244,609 | 1/1981 | Smitka | 285/424 X |
| 4,252,350 | 2/1981 | Smitka | 285/424 X |
| 4,288,115 | 9/1981 | Sullivan | 285/424 X |

FOREIGN PATENT DOCUMENTS

| | | | |
|---|---|---|---|
| 2501611 | 7/1976 | Fed. Rep. of Germany | |
| 2753446 | 5/1979 | Fed. Rep. of Germany | 285/424 |
| 2758295 | 6/1979 | Fed. Rep. of Germany | 285/424 |
| 1407796 | 9/1975 | United Kingdom | 285/364 |

Primary Examiner—Thomas F. Callaghan
Attorney, Agent, or Firm—Hirons, Rogers & Scott

[57] ABSTRACT

A duct jointing system has frame members each with a channel portion for engaging an end of a respective duct wall and an outwardly projecting portion. L-shaped connectors engage in openings in the outwardly projecting portions for securing the frame members together as frames and adjacent frames are connected by cleats engaging projections on the outwardly projecting portions and reinforcing flanges on the connectors, the flanges being cut-away to allow the cleats to be driven longitudinally into position.

14 Claims, 6 Drawing Figures

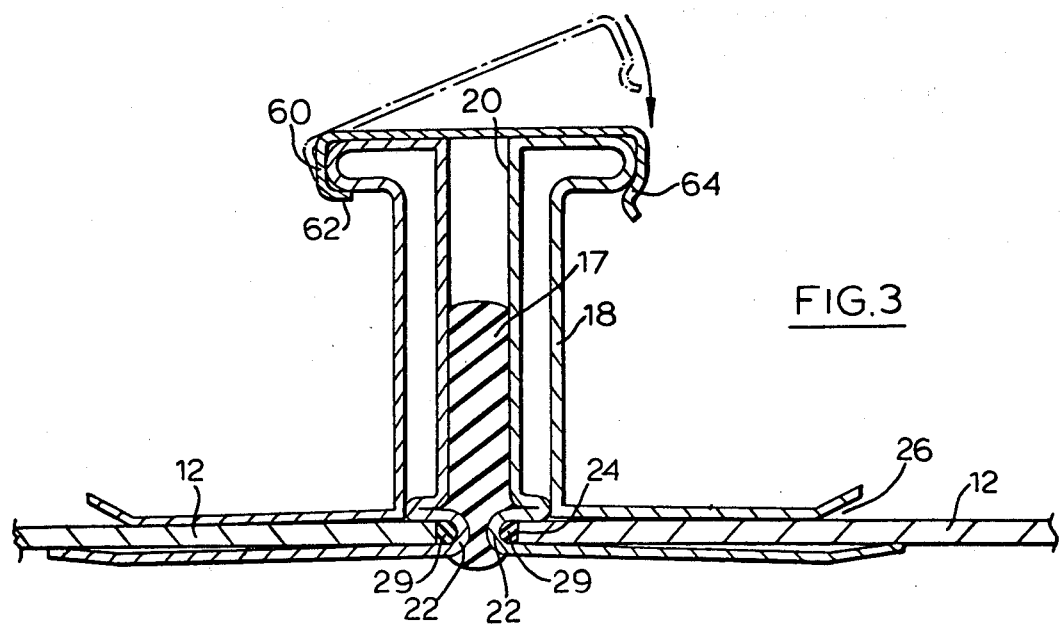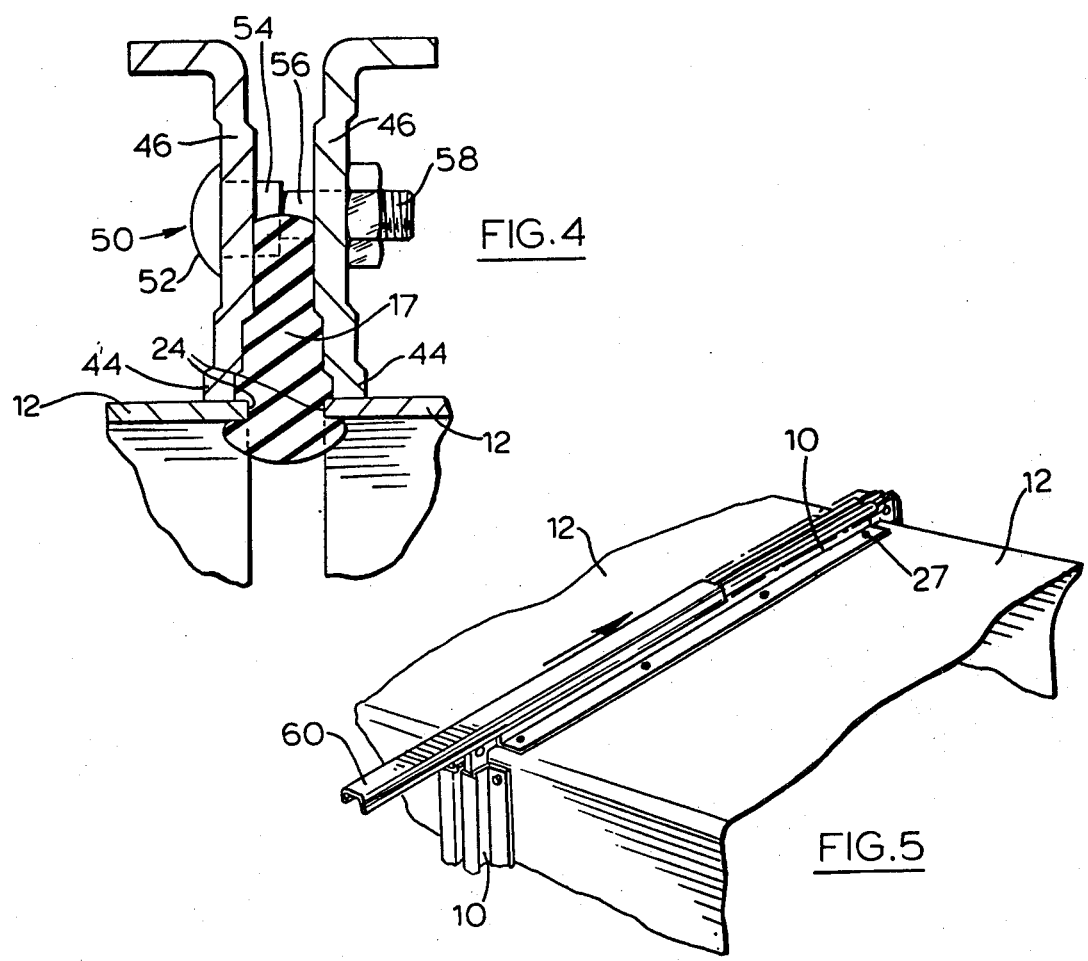

DUCT JOINTING SYSTEM

This is a divisional of application Ser. No. 081,501, filed Oct. 3, 1979 now U.S. Pat. No. 4,288,115.

FIELD OF THE INVENTION

This invention relates to a means and apparatus for connecting together sheet metal ducts in end-to-end relationship, for use with medium and high pressure and larger low pressure fluid flow systems.

BACKGROUND OF THE INVENTION

In the construction of buildings and installation of forced air heating and air conditioning systems, as well as in other applications such as solar heating arrangements, it is necessary to install and connect together sections of sheet metal ducts to form long, continuous conduits through which fluids, namely hot or cold air, may be conducted. Normally such ducts are rectangular in section, for ease of installation and economy of space. Their end-to-end jointing, of straight sections, curved sections, elbows, corners or the like, poses problems, however. To provide some form of interfitting connecting apparatus considerably increases the expense of manufacture of the sections and particularly installation costs. It is desirable that leakage of air at the joints be minimized. Also, the joints should consist of simple, economical components which can be readily and simply used and installed on the duct, either in the shop or on the site. Permanent jointing as by welding is undesirable, since it renders maintenance and replacement of individual sections difficult and is very costly. At the same time the joints must be durable and long lasting, able to withstand the conditions of use (exposure to heated or cooled air flows for periods of many years) in a building for extended periods of time.

BRIEF DESCRIPTION OF THE PRIOR ART

Previous proposals to meet this problem have used simple sheet metal cleats such as standing S-cleats, standing T-cleats etc., welded angle iron framework jointing systems, namely companion angle flanges, in which the ends of adjacent duct sections are provided with frames or flanges extending laterally outwardly from the duct sections. Then these frame pieces can be bolted or otherwise secured together in face-to-face relationship, to join the duct sections. Sealing gaskets or compounds can be provided between these frames attached to respective sections, to form a sealed joint along most of the connection length. In most of the aforementioned systems the effectiveness of the seal relies solely on the generous application of caulking which by nature is so unreliable that air losses in the order of 10% are common. In many common systems, the flanges are formed by notching and then bending back end areas of the ducts themselves, which is an imprecise yet costly method and leads to leakage.

For corner jointing arrangements, it has been proposed to make the frames extending along the duct section walls hollow and open-ended, and then to provide L-shaped corner pieces for insertion into the ends thereof. Then these corner pieces can be clamped or bolted together in face-to-face relationship also, to complete the jointing of the sections. General arrangements of this nature are to be found disclosed in U.S. Pat. No. 3,199,901 Jeppson; U.S. Pat. No. 3,428,324 Chambers; U.S. Pat. No. 565,499 Pattison and U.S. Pat. No. 4,123,094 Smitka.

All of the previously proposed arrangements have, however, suffered from one or more disadvantages, notably in connection with the degree of sealing. Without careful and proper arrangements of the design of the various interconnecting parts, so that they can be properly assembled in a close, sealing manner, allowing provision for additional, and in many cases complex and time consuming, sealing means were necessary, a joint sealed to protect against excess leakage of air flows from the duct joint is not achieved.

SUMMARY OF THE INVENTION

It is an object of the present invention to provide a novel form of duct connecting means of the above-described general type.

The present invention provides a duct connecting means which utilizes a combination of hollow elongated roll-formed flange members which extend along the major portion of the four wall edges of a duct, and generally planar L-shaped corner connecting pieces the limbs of which can be inserted into and co-operate with the ends of the flange members to complete the joint. Both the flange members and the L-shaped corner connecting pieces are shaped and designed as to their configuration and dimensions so as to enhance the overall sealing efficiency of the joint when in full assembly. The flange members each have channel portions in which the ends of the walls of the duct sections are received and the L-shaped corner connecting pieces connect together the flange members to form a frame on each duct section end. Adjacent duct section ends are then secured together by bolting together a pair of such frames, with a sealing gasket interposed between adjacent frames, by means of bolts inserted through the L-shaped corner connecting pieces. The outer edges of the L-shaped corner connecting pieces are formed with rearwardly extending flanges which are received in the flange members and which each extend around a corner section and along the edges of each limb of the respective L-shaped corner connecting piece and are formed at the corner section with a cut-away part to facilitate the insertion of a cleat onto the flange members of the adjacent frames.

The flange members are each formed with a protuberance with receives therein the end of a respective duct wall, these protuberances of the adjacent frames defining the narrowest part of the gap between the frames and biting into the gasket to provide a good seal. In addition, these protuberances allow the duct wall ends to extend into alignment with opposed faces of the frame members. Securing cleats are provided, of channel section, to fit over juxtaposed hollow flange members and corner piece flanges, to assist in securing all members in the assembled joint.

In another preferred feature of the invention, bolt holes are provided adjacent the corners of the L-shaped corner connecting pieces, so that the corner connecting pieces when assembled on adjacent sheet metal duct sections can be bolted together to complete the connection. Preferably also, the bolt hole has a section to engage a shoulder on a bolt and prevent its rotation, for ease of installation in relatively inaccessible positions. Preferably also, the shank of the bolt which is installed through the bolt holes of the L-shaped corner connecting pieces has a non-threaded portion on its shank corresponding in length to the separation between the installed corner connecting pieces and the thickness thereof, so as to prevent overtightening of a nut applied to the bolt, and thereby avoid distortion of the parts after assembly, with possible deterioration of the seal.

BRIEF REFERENCE TO THE DRAWINGS

FIG. 3 is a sectional view along the line 3—3 of FIG. 1;

FIG. 4 is a sectional view along the line 4—4 of FIG. 1;

FIG. 5 is a perspective view of part of a connection means as in FIG. 1, in partially assembled condition.

In the drawings, like reference numerals indicate like parts.

DETAILED DESCRIPTION OF THE SPECIFIC PREFERRED EMBODIMENT

Figure 1:
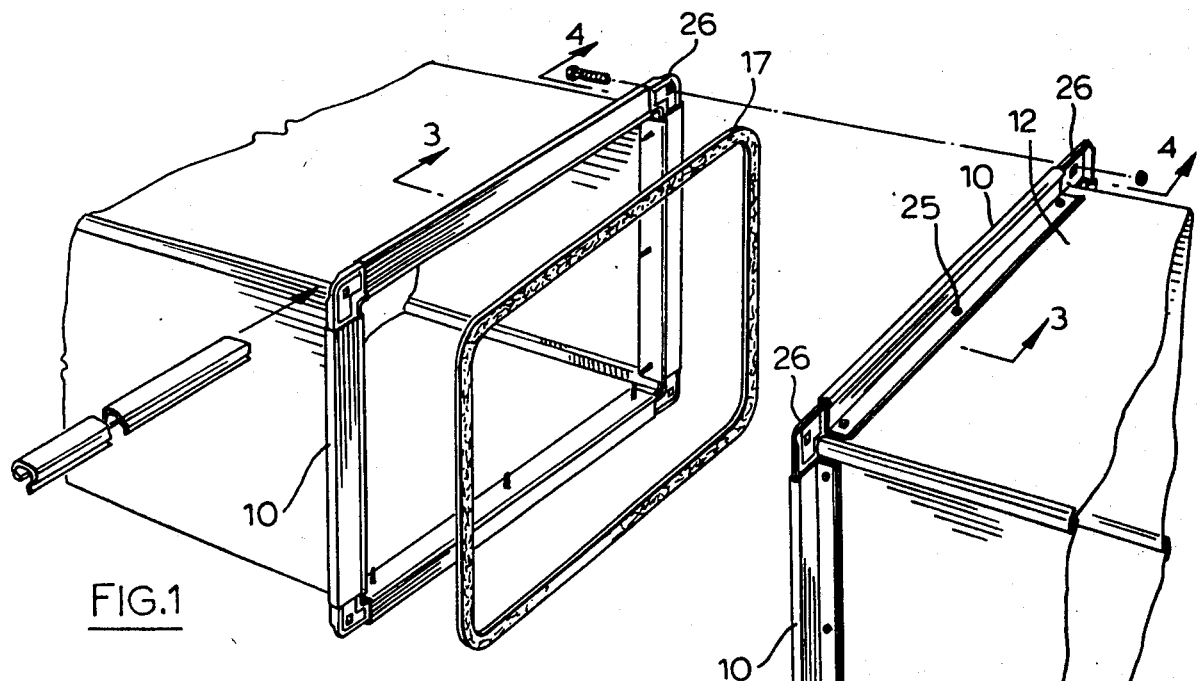
FIG. 1 is a general perspective view of two duct sections with connection means according to the invention, arranged ready for connection in end-to-end relationship.

The duct connection means as illustrated comprises a plurality of elongated hollow flange members such as 10, one such flange member being provided for the end of each side wall 12 of a rectangular section sheet metal duct 14 of a forced air system. Thus, as shown in FIG. 1, two essentially similar duct sections in end-to-end relationship are fitted on all four sides with flange members 10 ready for connection together. Between the longitudinal ends of adjacent flange members 10 on one duct section 14 are provided corner connecting pieces 26. A sealing gasket 17 is provided, to fit between the end faces of opposed sets of flange members 10 and corner connecting pieces 26.

Figure 2:
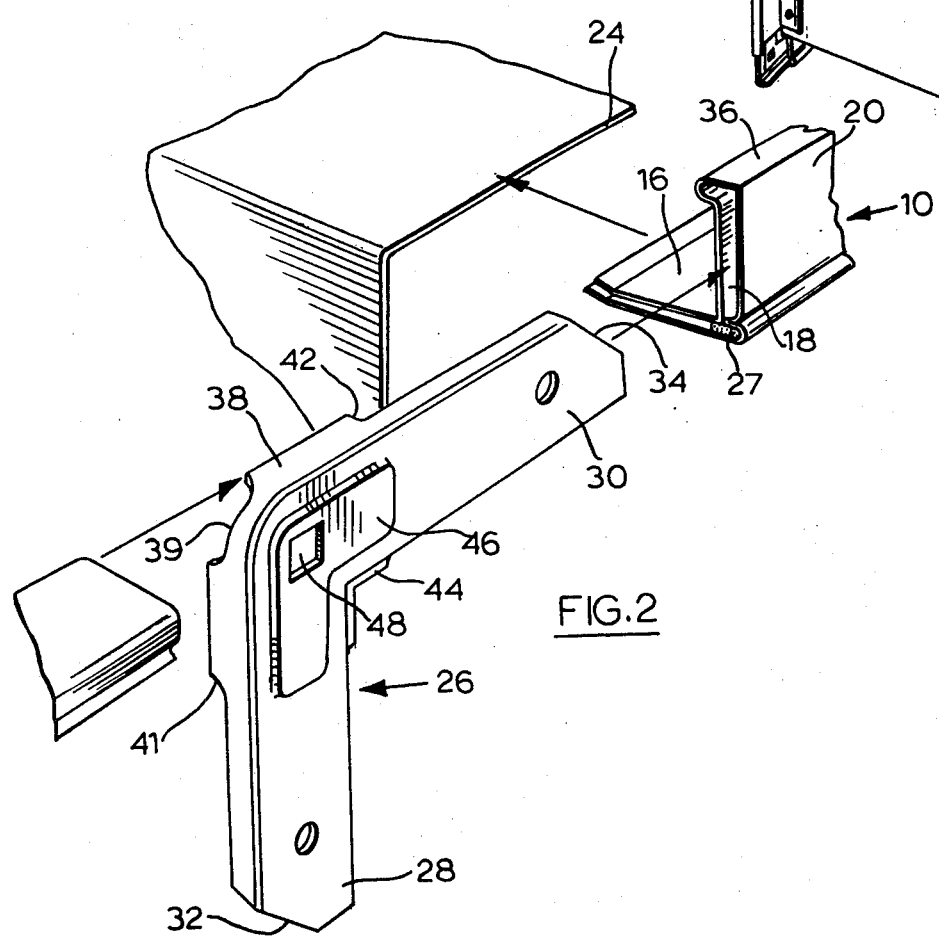
FIG. 2 is a fragmentary perspective view of parts of a duct connection means according to the invention.
Figure 6:
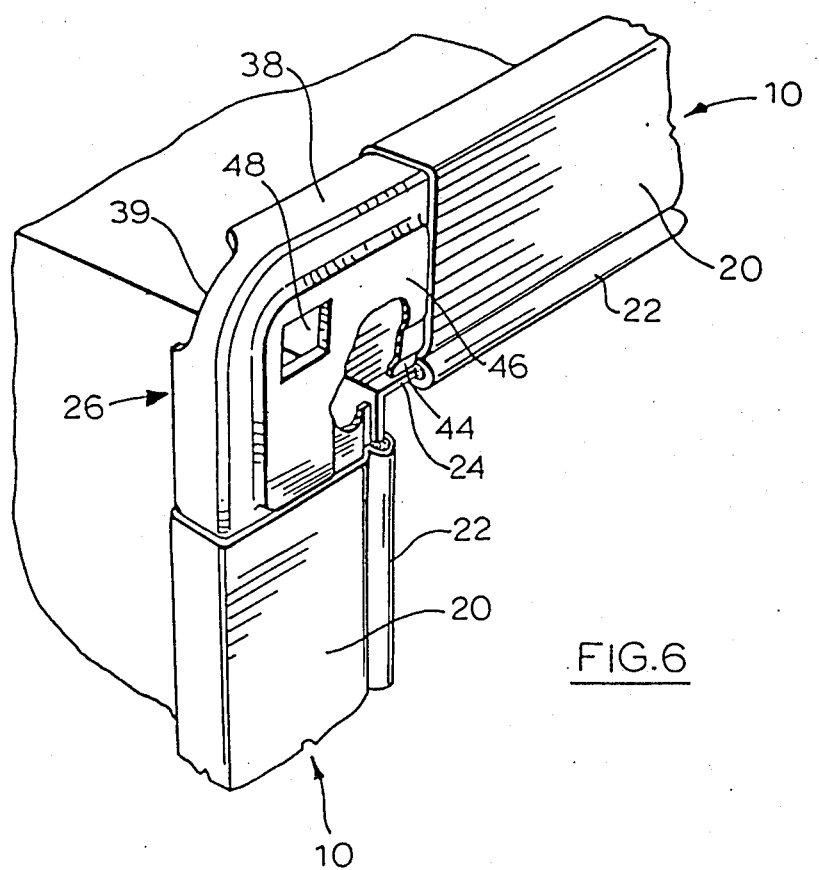
FIG. 6 is a perspective view of a corner of a piece of duct showing flange members assembled thereon and connected by a connecting member.

As shown in more detail in FIG. 2, each flange member 10 has a channel portion 16 and a transverse hollow portion 18, upstanding from the channel portion 16. The outer side face 20 of the upstanding portion 18 is generally planar.

The channel portion 16 extends beyond the plane of the outer face 20 of the upstanding portion 18, to terminate in a nose-like protruberance 22 into the interior of which a sealing compound 29 has been deposited (FIGS. 2 and 3). The channel member 16 thus accommodates the side wall 12 of the duct 14 received therein, to engage against the inner wall of protuberance 22 and form a stop means for the edge 24 of the side wall 12 of the duct, in substantial alignment with the smooth, planar side surface 20 of the upstanding portion 18 of the profile member 10. At its other end, the channel section 16 has a mouth 26, through which the side wall 12 can be inserted. Thus, the profile 10 can be positioned onto the side wall 12 until the edge 24 engages the inner wall of protuberance 22, and then the side wall is in correct relationship. The flange members 10 are attached to the ducts 14 by means of sheet metal screws 25. The profile is a hollow member, readily made by extrusion or roll forming, into the desired shape. The profiles 10 have a length which is less than the width of the duct walls 12, so that the sides of the duct walls extend a short way beyond the end of the profiles 10. When the two duct sections 14 with attached profiles 10 are placed in end-to-end relationship joining together, the protuberances 22 on opposed profiles define the narrowest part of the gap, along their full length. Thus an elongated planar sided pocket is formed, defined by planar side wall faces 20, for even reception and mounting of the sealing gasket 17. The protuberances 22 bite into the gasket 17 opposite the duct edges 24, to enhance the sealing of the joint. The metal walls of the profile 10 are of substantially constant thickness, so that the edges 24 of the opposed duct section 14 are separated from one another, in the assembled structure, by a distance of approximately two metal wall thicknesses. Mastic material 29 is provided inside the protuberances 22, to improve the seal of the duct edges 24 therein, and avoid leakage of air from the interior of the ducts out of channel portion 16.

L-shaped corner connecting pieces such as 26 are provided, one for each flange member 10. Each corner piece has similar first and second limbs 28, 30 extending mutually perpendicularly to one another, and each having an outwardly tapering end section 32, 34 respectively, for reception in the open end of the hollow flange member 10, inwardly of the planar side wall 20. At the outer ends of their transverse portions 18, each hollow flange member is provided with a short hollow rearwardly extending part 36. The outer edges of corner pieces 26 are provided with rearwardly extending flanges 38, which on assembly are received within the rearwardly extending part 36 of the hollow flange member 10. The flange 38 extends around the centre corner section 40 of the corner plate 26, and around the outer edge of each limb 28, 30 thereof, being provided with a cut-away part 39 at the corner. Step formations 41, 42 are provided on the flange 38 along each limb 28, 30 dividing the flange into narrow outer and broader inner sections. On assembly, the step formations 41, 42 engage against the edges of rearwardly extending part 36 of the hollow flange member 10 to form a continuous line with the outer edge of extending part 36 to allow for uniform contact of both components with a drive/snap connecting cleat 60 described below.

The corner section 40 of the corner piece 26 has a first laterally offset portion 44 at its inner corner section, and a second laterally offset portion 46 at its outer corner section (FIG. 2). The first offset portion 44 protrudes radially inwardly from the corner of the section 40, and is offset in the direction of extent of the flange 38, an amount which is approximately equal to a single metal thickness of the hollow flange member 10. The edges of the first offset portion 44 form stops and engage against the ends of the hollow flange members 10, on assembly therewith. The second offset portion 46 is laterally offset in the opposite direction, to the same approximate extent. This second offset portion 46 terminates at each end approximately alongside the step formations 41, 42. Thus, when the corner piece 26 is assembled in flange member 10, a smooth outer side wall surface is formed between outer side wall 20 of the flange member and the outer side of the offset portion 46. This provides a smooth seating face, all the way around the corner of the assembled joint, for reception of the outer part of sealing gasket 17 as previously described. The first offset portion 44 in the assembled joint, and the protruberance 22, allows the end edge 24 of the duct side walls 12, at the corners thereof, to protrude into the gap between the duct sections, beyond the surfaces defined by the corner piece 26 at that location. This is as shown in FIG. 4. The end edges can, therefore, protrude to bite into the gasket 17 at this corner location, to complete the corner sealing of duct connection means in a simple but highly efficient manner, in accordance with the present invention.

A bolt hole 48 is provided, extending through the corner piece 26, through the second laterally offset portion 46 thereof. The periphery of the bolt hole 48 is square, so as to receive therein and hold against retention a bolt 50 having a head 52, square section shoulder 54, unthreaded portion 56 and threaded portion 58. In the assembly, the outer side faces of the corner pieces 26 are separated from one another, a distance of two metal thicknesses corresponding to the thickness of the two face-to-face abutting protuberances 22. The bolt therefore has an unthreaded portion which corresponds in length to the separation between the two corner pieces 26 and the thickness of the second corner piece. The square portion of the bolt is of approximately the same length as the thickness of the bolt hole 48. Thus, in the assembly, bolts can be passed through adjacent corner pieces and bolted together by means of nuts, but the nuts cannot be over-tightened to cause bending of the corner pieces towards one another, and consequent distortion of the corner pieces and the hollow flange members, with the risk of spoiling the seal, is avoided.

This assembly is in some circumstances completed by the provision of cleats 60, of channel section but having lower inwardly extending gripping edges 62, 64. The cleats are adapted to be received over and grip the rearwardly extending outer parts 36 of adjacent hollow flange members 10 and rearwardly extending flange 38 of corner pieces 26 to hold the connection means together, as an alternative to or in addition to the bolts 50. Where the location of installation of the assembly permits, the cleats 60 may be clipped over the parts 36 from the outer side as indicated in FIG. 3. In circumstances where access to the outer side of a duct is not provided, e.g. when the duct is alongside a ceiling, the cleat 60 may be applied from one end of a pair of corners 26, as shown in FIG. 5. The cleat 60 is applied after the corner pieces 26 and flange members 10 have been assembled. The provision of cutaway part 39 at the outer corner in the flange 38 of corner piece 26 permits the cleat 60 to be installed from one end of the flange members 10, and forcibly driven along the length of the adjacent flange members 10 to the correct location. The length of the cleat in this case is such that it contacts the corners 26 on either end of the duct 14. In this way, the need for installation of bolt 58 at the far corner, which may be totally inaccessible, is avoided.

Fluid flow duct systems of the type described are subject to radially outward deflections, due to the air pressures in the duct when air is flowing therethrough. This can cause bending outwardly at the duct section joint, and spoil the effectiveness at the seal of such joints. In the present invention, this deflection tendency may be counteracted by inserting into the hollow flange members 10 a strip of reinforcing steel, of a thickness corresponding to that of the aperture through the hollow flange members, and a length suitable to extend from corner piece to corner piece, within the hollow flange members. Such reinforcing stiffness limit the amount of deflection, so as to prevent undesirable contact with proximate structures at the location of installation, where desired.

Thus the connection means according to the invention provides a simple and efficient duct jointing and sealing arrangement, which is easy to install. It can be used on a wide variety of duct systems, and can be installed by unskilled workmen, rapidly and efficiently.

It will be appreciated that the specific embodiment illustrated and described herein in detail is by way of example only and is not to be construed as limiting. The scope of the present invention is defined only by the appended claims.

I claim:

1. A duct jointing system for joining end-to-end two abutting sections of sheet metal duct, comprising;

a plurality of elongate flange members;

said flange members each having a longitudinal channel portion defining a longitudinal opening for receiving therein one end of a respective wall of a section of said sheet metal duct and a longitudinal hollow portion upstanding from said channel portion;

generally L-shaped corner connection pieces linking said flange members together in mutually angularly disposed relationship to form a frame;

each corner connecting piece comprising a pair of limbs which are engaged in respective ones of said hollow portions and which are connected at a common junction portion, the said common junction portion and at least the portions of the limbs immediately adjacent thereto being provided around their radially outer edges with flange means projecting laterally and rearwardly therefrom for stiffening the respective portions of the piece against bending as two such pieces ae secured together to seal the joint between them; and cleat means for securing said flange members in side-to-side relationship with like flange members on the abutting section of said duct by engagement of the cleat means over the side-by-side longitudinal hollow portions of the flange members;

each flange member longitudinal hollow portion having a hollow cleat-engaging portion projecting laterally therefrom for engagement by and within said cleat means, the flange means of the respective corner connecting piece being engaged by and within said hollow cleat-engaging portion;

wherein each said connection piece flange means have a cut-away portion at the outer corner of its common junction portion, said cleat means being slidable longitudinally of said side-to-side flange member hollow portions, through said cut-away portions, and into and out of engagement with said laterally projecting hollow cleat-engaging portions.

2. A duct jointing system as claimed in claim 1, wherein said connection piece flange means comprise, on each of said limbs, a first flange portion received in a respective one of said hollow cleat-engaging portions and a second flange portion wider than said first flange portion so as to provide additional stiffening at said junction portion and to abut against the respective one of said laterally projecting hollow cleat-engaging portions.

3. A duct jointing system as claimed in claim 1, wherein the said common junction portion of each corner connecting piece is provided with a portion offset forwardly therefrom by an amount equal to the thickness of the flange member wall forming the longitudinal hollow portion so as to be co-planar with an outer side face of the longitudinal hollow portion for engagement with sealing means which are interposed between two abutting flange members.

4. A duct jointing system as claimed in claim 1, wherein the said common junction portion of each corner connecting piece is provided at an inner corner edge thereof with a portion offset rearward therefrom which will permit the protrusion of the respective sheet metal duct wall corner beyond the connection piece to facilitate sealing between the abutting duct corners.

5. A duct jointing system for joining end-to-end two abutting sections of sheet metal duct, comprising;

a plurality of elongate flange members;

said flange members each having a longitudinal channel portion defining a longitudinal opening for receiving therein one end of a respective wall of a section of said sheet metal duct and a longitudinal hollow portion upstanding from said channel portion;

generally L-shaped corner connection pieces linking said flange members together in mutually angularly disposed relationship to form a frame;

each corner connecting piece comprising a pair of limbs which are engaged in respective ones of said hollow portions and which are connected at a common junction portion, the said common junction portion and at least the portions of the limbs immediately adjacent thereto being provided around their radially outer edges with flange means projecting laterally and rearwardly therefrom for stiffening the respective portions of the piece against bending as two such pieces ae secured together to seal the joint between them; and cleat means for securing said flange members in side-to-side relationship with like flange members on the abutting section of said duct by engagement of the cleat means over the side-by-side longitudinal hollow portions of the flange members;

each flange member longitudinal hollow portion having a hollow cleat-engaging portion projecting laterally therefrom for engagement by and within said cleat means, the flange means of the respective corner connecting piece being engaged by and within said hollow cleat-engaging portion;

wherein said connection piece flange means comprise, on each of said limbs, a first flange portion received in a respective one of said hollow cleat-engaging portions and a second flange portion wider than said first flange portion so as to provide additional stiffening at said junction portion and to abut against the respective one of said laterally projecting hollow cleat-engaging portions.

6. A duct jointing system as claimed in claim 5, wherein the said common junction portion of each corner connecting piece is provided with a portion offset forwardly therefrom by an amount equal to the thickness of the flange member wall forming the longitudinal hollow portion so as to be co-planar with an outer side face of the longitudinal hollow portion for engagement with sealing means which are interposed between two abutting flange members.

7. A duct jointing system as claimed in claim 5, wherein the said common junction portion of each corner connecting piece is provided at an inner corner edge thereof with a portion offset rearward therefrom which will permit the protrusion of the respective sheet metal duct wall corner beyond the connection piece to facilite sealing between the abutting duct corners.

8. A sheet metal corner connecting piece for a duct jointing system for joining together end-to-end sections of sheet metal duct, which system comprises a plurality of elongate flange members;

each flange member having a longitudinal channel portion defining a longitudinal opening for receiving therein one end of a respective sheet metal wall of a respective duct section and a longitudinal hollow portion upstanding from said channel portion;

and cleat means for securing said flange members in side-to-side relationship with like flange members on an abutting section of said duct by engagement of the cleat means over the side-by-side longitudinal hollow portions of the flange members;

each corner connecting piece being generally L-shaped and comprising a pair of limbs for engagement in respective ones of said flange member hollow portions and connected at a common junction portion for linking said flange members together in mutually angularly disposed relationship to form a frame;

wherein the said common junction portion and at least the portions of the limbs immediately adjacent thereto are provided around their radially outer edges with flange means projecting laterally and rearwardly therefrom for stiffening the respective portions of the piece against bending as two such pieces are secured together to seal the joint between them;

said connection piece flange means having a cut-away portion at the outer corner of the common junction portion, whereby the said cleat means are slidable longitudinally through said cut-away portion for securing engagement with the side-by-side longitudinal hollow portions.

9. A sheet metal corner connecting piece as claimed in claim 8, wherein said connection piece flange means comprise, on each of said limbs, a first flange portion adapted to be received in a respective one of said upstanding longitudinal hollow portions and a second flange portion wider than said first flange portion so as to provide additional stiffening at said junction portion and adapted to abut against the respective end of the respective upstanding longitudinal hollow portion when inserted therein.

10. A sheet metal corner connecting piece as claimed in claim 8, wherein the said common junction portion of each corner connecting piece is provided with a portion offset forwardly therefrom by an amount equal to the thickness of the flange member wall forming the longitudinal hollow portion so as to be co-planar with an outer side face of the longitudinal hollow portion for engagement with sealing means which are interposed between two abutting flange members.

11. A sheet metal corner connecting piece as claimed in claim 8, wherein the said common junction portion of each corner connecting piece is provided at an inner corner edge thereof with a portion offset rearward therefrom which will permit the protrusion of the respective sheet metal duct wall corner beyond the connection piece to facilite sealing between the abutting duct corners.

12. Asheet metal corner connecting piece for a duct jointing system for joining together end-to-end sections of sheet metal duct, which system comprises a plurality of elongate flange members;

each flange member having a longitudinal channel portion defining a longitudinal opening for receiving therein one end of a respective sheet metal wall of a respective duct section and a longitudinal hollow portion upstanding from said channel portion;

and cleat means for securing said flange members in side-to-side relationship with like flange members on an abutting section of said duct by engagement of the cleat means over the side-by-side longitudinal hollow portions of the flange members;

each corner connecting piece being generally L-shaped and comprising a pair of limbs for engagement in respective ones of said flange member hollow portions and connected at a common junction portion for linking said flange members together in mutually angularly disposed relationship to form a frame;

wherein the said common junction portion and at least the portions of the limbs immediately adjacent thereto are provided around their radially outer edges with flange means projecting laterally and rearwardly therefrom for stiffening the respective portions of the piece against bending as two such pieces are secured together to seal the joint between them;

said flange means comprising, on each of said limbs, a first flange portion adapted to be received in a respective one of said upstanding longitudinal hollow portions and a second flange portion wider than said first flange portion so as to provide additional stiffening at said junction portion and adapted to abut against the respective end of the respective upstanding longitudinal hollow portion when inserted therein.

13. A sheet metal corner connecting piece as claimed in claim 12, wherein the said common junction portion of each corner connecting piece is provided with a portion offset forwardly therefrom by an amount equal to the thickness of the flange member wall forming the longitudinal hollow portion so as to be co-planar with an outer side face of the longitudinal hollow portion for engagement with sealing means which are interposed between two abutting flange members.

14. A sheet metal corner connecting piece as claimed in claim 12, wherein the said common junction portion of each corner connecting piece is provided at an inner corner edge thereof with a portion offset rearward therefrom which will permit the protrusion of the respective sheet metal duct wall corner beyond the connection piece to facilite sealing between the abutting duct corners.

* * * * *